US010677344B2

(12) United States Patent
Wang et al.

(10) Patent No.: US 10,677,344 B2
(45) Date of Patent: Jun. 9, 2020

(54) AUTO RETURN TO PARK ROTARY SHIFTER

(71) Applicant: KUSTER NORTH AMERICA, INC., Troy, MI (US)

(72) Inventors: Yong Qiang Wang, Troy, MI (US); Brian Mayville, Northville, MI (US); Christopher Soave, Brighton, MI (US); Christopher Curtis, Orion, MI (US); Scott Hengy, Davison, MI (US)

(73) Assignee: Kuster North America, Inc., Troy, MI (US)

( * ) Notice: Subject to any disclaimer, the term of this patent is extended or adjusted under 35 U.S.C. 154(b) by 209 days.

(21) Appl. No.: 15/910,091

(22) Filed: Mar. 2, 2018

(65) Prior Publication Data
US 2018/0259062 A1    Sep. 13, 2018

Related U.S. Application Data

(60) Provisional application No. 62/469,959, filed on Mar. 10, 2017.

(51) Int. Cl.
F16H 59/08    (2006.01)
F16H 61/24    (2006.01)
(Continued)

(52) U.S. Cl.
CPC ......... *F16H 59/08* (2013.01); *F16H 61/0006* (2013.01); *F16H 61/24* (2013.01);
(Continued)

(58) Field of Classification Search
CPC ................. F16H 59/08; F16H 59/0278; F16H 2059/081; F16H 61/22; F16H 63/38;
(Continued)

(56) References Cited

U.S. PATENT DOCUMENTS 3,901,097 A    8/1975 Williams et al.
5,884,528 A    3/1999 Ludanek et al.
(Continued)

FOREIGN PATENT DOCUMENTS

EP    1655516 A2 *    5/2006    ............. B60K 37/06
EP    1946983 B1        2/2010
(Continued)

Primary Examiner — Jake Cook
Assistant Examiner — T. Scott Fix
(74) Attorney, Agent, or Firm — Dinsmore & Shohl LLP

(57) ABSTRACT

A rotary shifter having a housing with a bezel cover. An auto return to park mechanism is provided and includes a knob supported upon the bezel cover. A rotary disk stopper is secured to the knob and seated within the housing, a spring rotationally biasing the end stopper relative to the housing. A solenoid is supported within the housing and engages the stopper in a first condition limiting the knob to manual rotary shifting between Park, Reverse, Neutral and Drive gear shift positions. A PCB board is integrated into the housing and communicable with at least one external sensor associated with a driver exit condition. Upon a triggering of the exit condition with the shifter in other than a Park position, the solenoid is energized to disengage the end stopper in a second release condition permitting the spring to reset the stopper and knob to the Park position.

16 Claims, 11 Drawing Sheets

(51) Int. Cl.
*F16H 61/00* (2006.01)
*F16H 59/02* (2006.01)

(52) U.S. Cl.
CPC ............... *F16H 2059/0295* (2013.01); *F16H 2059/081* (2013.01); *F16H 2061/247* (2013.01)

(58) Field of Classification Search
CPC ......... F16H 2061/241; F16H 2061/243; F16H 2061/245; F16H 2061/247; B60K 37/06; Y10T 74/2014; Y10T 74/20098; Y10T 74/20128; Y10T 74/1418; Y10T 74/1424; H01H 19/16; G05G 5/02; G05G 5/03; G05G 5/04; G05G 5/06; G05G 5/065; G05G 5/08
USPC .............. 74/473.21, 473.23, 473.24, 473.25, 74/473.26, 473.28
See application file for complete search history.

(56) References Cited

U.S. PATENT DOCUMENTS

| | | | |
|---|---|---|---|
| 5,919,112 A | 7/1999 | Michael et al. | |
| 6,059,687 A | 5/2000 | Durieux et al. | |
| 6,151,977 A | 11/2000 | Menig et al. | |
| 6,295,887 B1 | 10/2001 | DeJonge et al. | |
| 6,564,661 B2 | 5/2003 | DeJonge | |
| 6,806,810 B2 | 10/2004 | Robinson | |
| 6,834,563 B2 | 12/2004 | Seekircher | |
| 7,028,575 B2 | 4/2006 | Ehrmaier et al. | |
| 7,571,662 B2 | 8/2009 | Pickering et al. | |
| 7,770,486 B2 | 8/2010 | Morita et al. | |
| 7,913,583 B2 | 3/2011 | Reppuhn et al. | |
| 8,170,757 B2 | 5/2012 | Furhoff et al. | |
| 8,336,424 B2 | 12/2012 | Miret et al. | |
| 8,485,061 B2 | 7/2013 | Kliemannel et al. | |
| 8,490,509 B2 | 7/2013 | Giefer et al. | |
| 8,897,978 B2 | 11/2014 | Fyie et al. | |
| 9,239,108 B2 | 1/2016 | Ganter et al. | |
| 9,334,949 B2 | 5/2016 | Fett et al. | |
| 9,400,049 B2 | 7/2016 | Heo et al. | |
| 9,529,378 B2 | 12/2016 | Jeon | |
| 2002/0152827 A1 | 10/2002 | Hayashi et al. | |
| 2006/0053930 A1 | 3/2006 | Morita et al. | |
| 2009/0000413 A1 | 1/2009 | Furhoff et al. | |
| 2009/0107287 A1* | 4/2009 | Seki | B60K 37/06 74/504 |
| 2013/0305865 A1* | 11/2013 | Howe | F16H 61/12 74/473.12 |
| 2014/0007726 A1 | 1/2014 | Muraki et al. | |
| 2014/0345409 A1 | 11/2014 | Watanabe | |
| 2015/0027861 A1 | 1/2015 | Hoskins et al. | |
| 2015/0135878 A1 | 5/2015 | Park et al. | |
| 2015/0143938 A1 | 5/2015 | Swaita et al. | |
| 2015/0152958 A1 | 6/2015 | Watanabe et al. | |
| 2015/0167827 A1 | 6/2015 | Fett et al. | |
| 2015/0167829 A1 | 6/2015 | Kim | |
| 2015/0266376 A1 | 9/2015 | Tokumo et al. | |
| 2015/0274170 A1 | 10/2015 | Sun | |
| 2015/0369357 A1 | 12/2015 | Lee et al. | |
| 2016/0312882 A1* | 10/2016 | Heo | F16H 59/08 |
| 2017/0074391 A1* | 3/2017 | Tebbe | F16H 59/08 |

FOREIGN PATENT DOCUMENTS

| | | |
|---|---|---|
| GB | 1484146 A | 8/1977 |
| GB | 1489898 A | 10/1977 |
| GB | 1489899 A | 10/1977 |
| KR | 10-2013-0081917 A | 7/2013 |

\* cited by examiner

AUTO RETURN TO PARK ROTARY SHIFTER

CROSS REFERENCE TO RELATED APPLICATIONS

The present application claims the priority of U.S. Ser. No. 62/469,959 filed Mar. 10, 2017.

BACKGROUND OF THE INVENTION

Field of the Invention

The present invention discloses an auto return to park rotary shifter which can shift between each of Park, Reverse, Neutral, Drive and Sport positions (the latter providing higher RPM at lower speeds for such as performance driving conditions). Unique aspects of the proposed system include the incorporation of a solenoid for selectively locking and controlling rotation of an outer toothed end stopper relative to a plunger housing (opposite legs of a torsional spring biasing each of an end stopper abutment and an inside rim surface location of the housing).

In normal shifting operation, the torsional (return) spring is loaded between the end stopper and housing and will cause the affixed knob to be stopped by the at the Park and Drive positions (shifting effort being generated by a pair of steel balls biased by coil springs integrated into extending portions of the housing and which are guided within inner perimeter extending detent surfaces in the housing concurrent with the torsional spring leg being continuously repositioned (pushed over) adjoining ratchet teeth formed within an underside surface of the housing.

Among the unique features of the assembly is a PCB board and related sensor in communication with a vertically displaceable magnet and outer holder. It is understood that the vertical travel of the magnet holder in a direction toward the sensor to confirm resetting of the Park position is controlled by the relative rotation between the knob and the end stopper which occurs upon the energization of the solenoid to a release/retracted position relative to the end stopper, at which the torsional spring counter rotates the stopper to the Park position.

A plurality of extraneous vehicle sensors are arranged throughout the vehicle in communication with the solenoid for determining a Park reset triggering condition, such determined to occur by the driver unlatching the seatbelt, exiting the vehicle by opening the door, etc., with the vehicle in gear. Once one of these conditions has been met, the given sensor instructs the solenoid to retract from engagement with the outer toothed location of the end stopper in a released condition. Once the new Park position is established, and as confirmed by the proximity condition established between the magnet and holder via the PCB mounted sensor (such being any suitable type of inductive or magnetic Hall effect sensor), the solenoid is once again de-energized in order to reengage the end stopper.

Background of the Relevant Art

The prior art is documented with examples of rotary shifters such as which are depicted in the environmental views of FIGS. 1A-1D. These include general illustrations for each of commercially known shifters associated with existing vehicles including each of Land Rover (at 2 in FIG. 1A), Chrysler 200 (at 4 in FIG. 1B, Ford Fusion (at 6 in FIG. 1C) and Jaguar (at 8 in FIG. 1D) platforms.

The prior art further discloses a number sensor activated linkages for establishing a return to Park condition (both associated with rotary and linear shifter assemblies). Examples of these most notably include each of Fett, US 2015/0167827, Tokumo US 2015/0266376, Watanabe US 2015/0152958, and Swaita US 2015/0143938.

A second class of references include each of Ganter, U.S. Pat. No. 9,239,108, Kliemannel, U.S. Pat. No. 8,485,061, Morita US 2006/0053930, Jeon U.S. Pat. No. 9,529,378, Morita U.S. Pat. No. 7,770,486, and Reppuhn U.S. Pat. No. 7,913,583, the latter of which including a solenoid disposed within a grip portion coupled with a mechanical linkage and including a plunger preventing the linkage from biasing the locking member out of a park position. Additional rotary shifter designs are depicted in each of Watanabe, US 2014/0345409, Seki US 2009/0107287, and Miret U.S. Pat. No. 8,336,424.

SUMMARY OF THE PRESENT INVENTION

The present invention discloses a rotary shifter having a housing with a bezel cover. An auto return to park mechanism is provided and includes a knob supported upon the bezel cover. A rotary disk stopper is secured to the knob and seated within the housing, a spring rotationally biasing the end stopper relative to the housing.

A solenoid is supported within the housing and engages the stopper in a first condition limiting the knob to manual rotary shifting between Park, Reverse, Neutral and Drive gear shift positions. A PCB board is integrated into the housing and communicable with at least one external sensor associated with a driver exit condition. Upon a triggering of the exit condition with the shifter in other than a Park position, the solenoid is energized to disengage the end stopper in a second release condition permitting the spring to reset the stopper and knob to the Park position.

Additional features include the bezel cover having an annular opening defined within and which receives the rotary knob. An inner aperture defining rim is incorporated into a main package defining portion of the housing, the rim further exhibiting a perimeter extending detent profile which is defined by a plurality of inter-connecting and inner rim configured surfaces.

A cylindrical shaped plunger housing is secured the rotary knob, the plunger housing having a pair of lower and opposite and radial projecting guiding portions, these being interiorly hollowed for receiving a pair of opposing steel balls and supporting detent springs. The rotary knob further includes an underside collar affixing within an open upper rim interior of the plunger housing which is in turn mounted through the bezel cover opening and a further opening associated with the main package housing so that the radial projecting portions align with the inwardly facing detent profile, the outwardly influenced steel balls supported within the open interior of the radial portions interacting in tactile induced fashion with the detent profile edges defined within the inner rim surface of the package housing to establish guided rotation of the knob.

Features associated with the driver exit condition further include a magnet holder integrated into an underside of the plunger housing in proximity to the PCB board integrated into the housing, such that relative motion between the knob and the end stopper causing the magnet holder to displace downwardly toward the PCB board. A plurality of light pipes are provided and including each of a center Park position light pipe and a separate plurality of further shifter position light pipes, the light pipes being arranged within the housing so that bottom open ends are in communication with individual LED's integrated into the PCB board. Individual pairs of LED's are provided for each light pipe and for providing each of backlighting and gear indication respectively for each shifter position.

Yet additional features include the spring further defining a torsional spring supported about a stem of the magnet holder, a first extending leg of the spring abutting against the end stopper, an opposite second end of the spring biasing against a plurality of ratchet teeth configured upon an underside of the inner aperture defined rim in the housing. The auto return to park mechanism seats within a first cavity defined in the package housing, with the solenoid being supported in a second cavity, and a linearly extending portion of the solenoid extending into the first cavity and engaging an outward toothed location of the end stopper. The plunger housing further includes underside projections which abut damper locations of the end stopper when shifting between the gear positions.

BRIEF DESCRIPTION OF THE DRAWINGS

Reference will now be made to the attached illustrations, when read in combination with the following detailed description, wherein like reference numerals refer to like parts throughout the several views: and in which.

DETAILED DESCRIPTION OF THE PREFERRED EMBODIMENTS

Figure 1A:
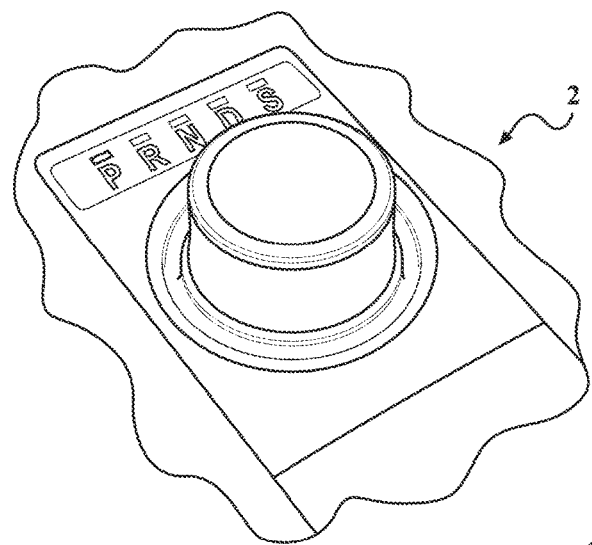
FIGS. 1A-1D are illustrations of prior art examples of rotary shifters according to the Prior Art.
Figure 1B:
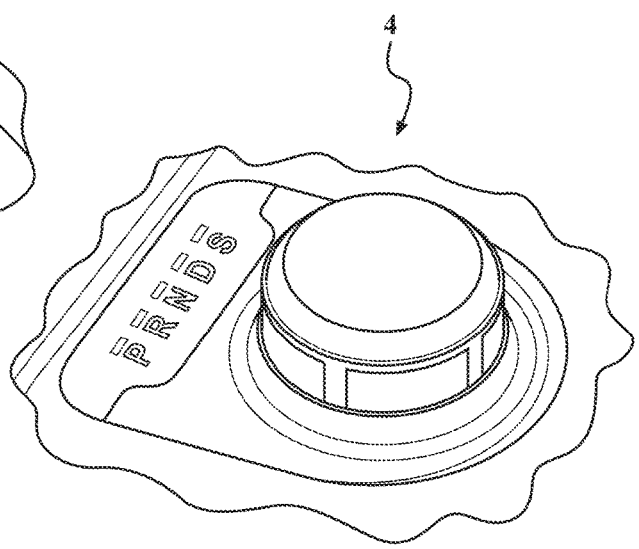
Figure 1C:
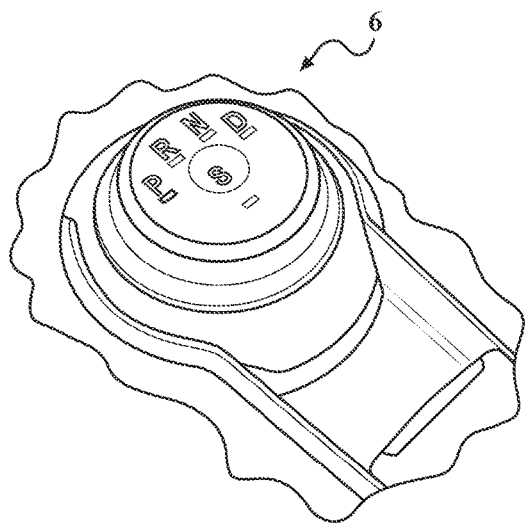
Figure 1D:
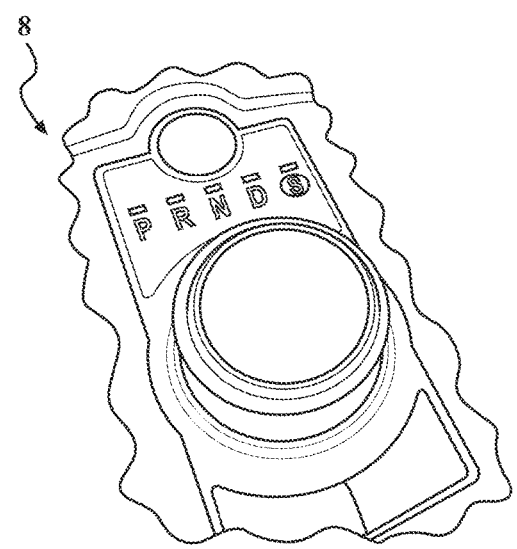
Figure 2:
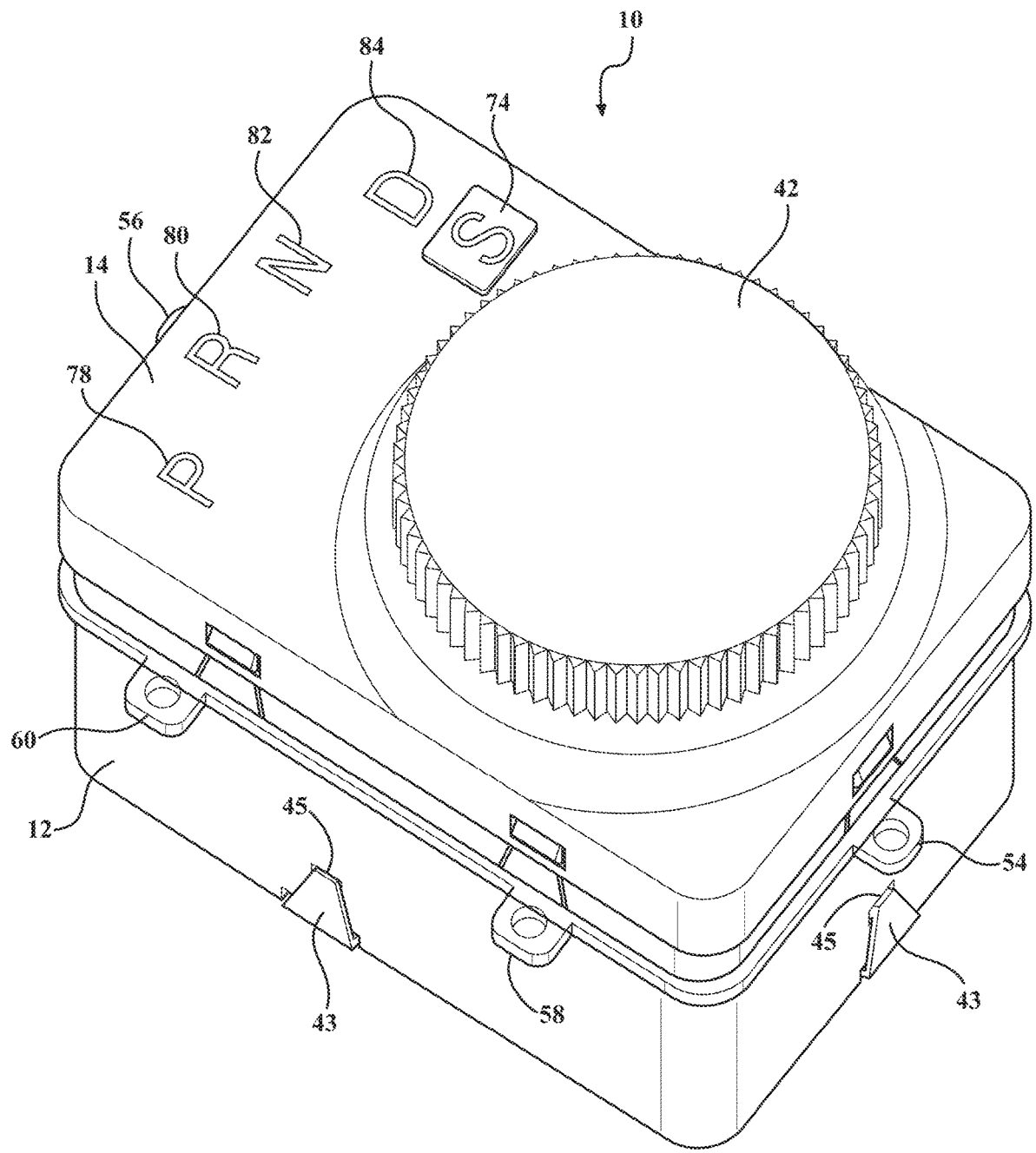
FIG. 2 is a plan view of a rotary shifter according to one non-limiting variant of the present invention and depicting a rotary knob which can shift between each of Park, Reverse, Neutral, and Drive gear positions.

With reference now to the illustrations collectively shown in FIGS. 2-11, the present invention discloses a rotary shifter with auto return to park functionality which will now be described. FIG. 2 depicts and assembly perspective view and FIG. 3 further provides an exploded view of the rotary shifter package, generally at 10, according to one non-limiting variant of the present invention.

Figure 3:
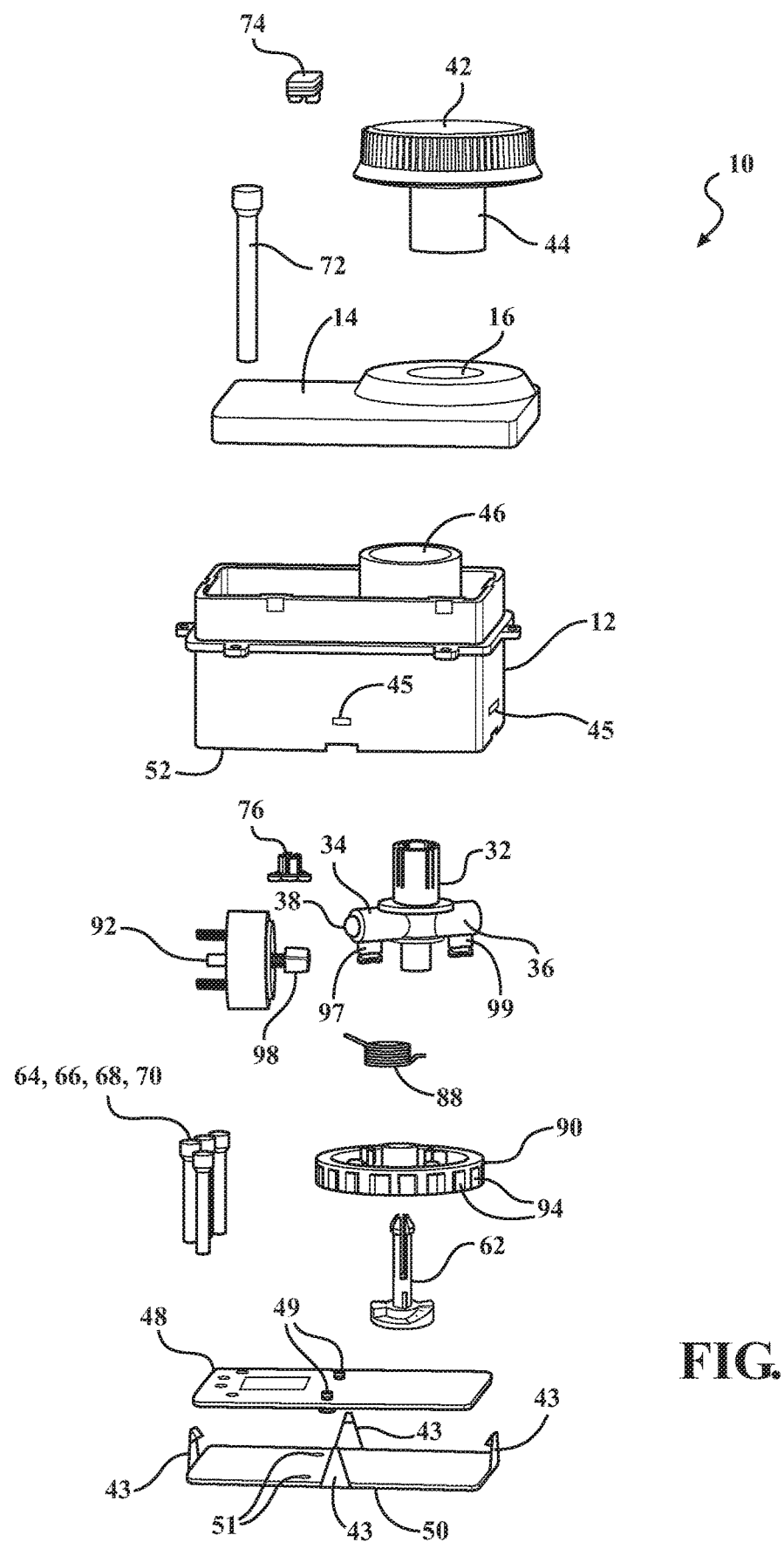
FIG. 3 is an exploded view of the rotary shifter package with auto return to park functionality according to one non-limiting variant of the present invention.

With further reference to each of FIGS. 2-3, the shifter assembly includes a main package defining and three dimensional rectangular shaped housing 12 over which is attached a bezel cover 14. The bezel cover further includes an annular opening (see inner rim 16 in FIG. 3) defined within and which provides a receiving access to the features of the rotary knob subassembly as will be further described.

Figure 6:
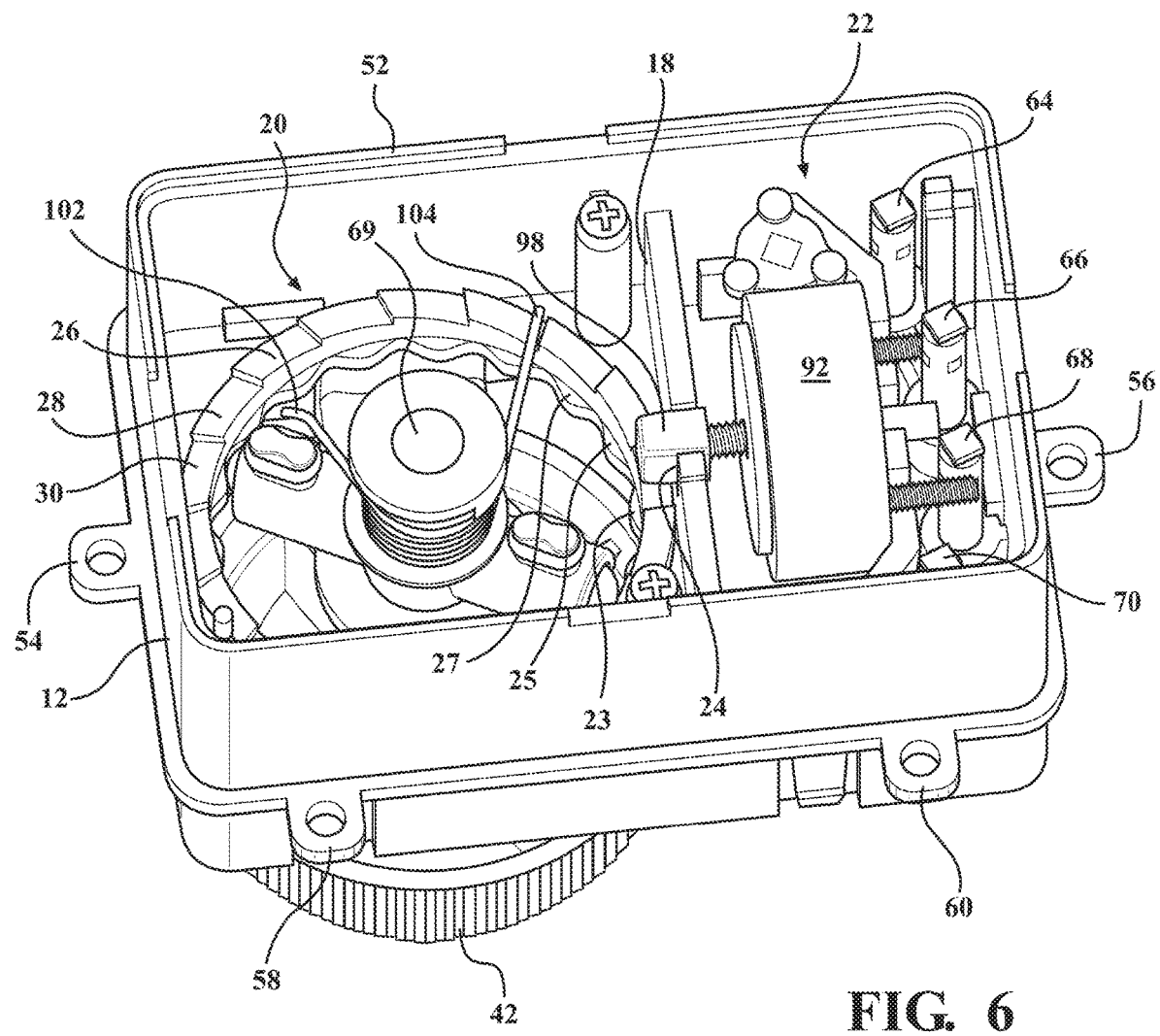
FIG. 6 is an underside assembled view depicting guided rotation between the knob integrated plunger housing and the outer package supporting housing assisted by a pair of opposing steel balls and supporting detent springs which are integrated into opposite radial extending bottom portions, a ratchet style return spring being integrated between the end stopper (not shown) and which guides the rotation of the knob relative to an opposing and perimeter extending detent profile defined within an inner rim surface of the package housing, the configuration of the detent profile further providing clear tactile/haptic feel of a given shift position and further ensures that the knob will be returned to center at all gear positions.
Figure 7:
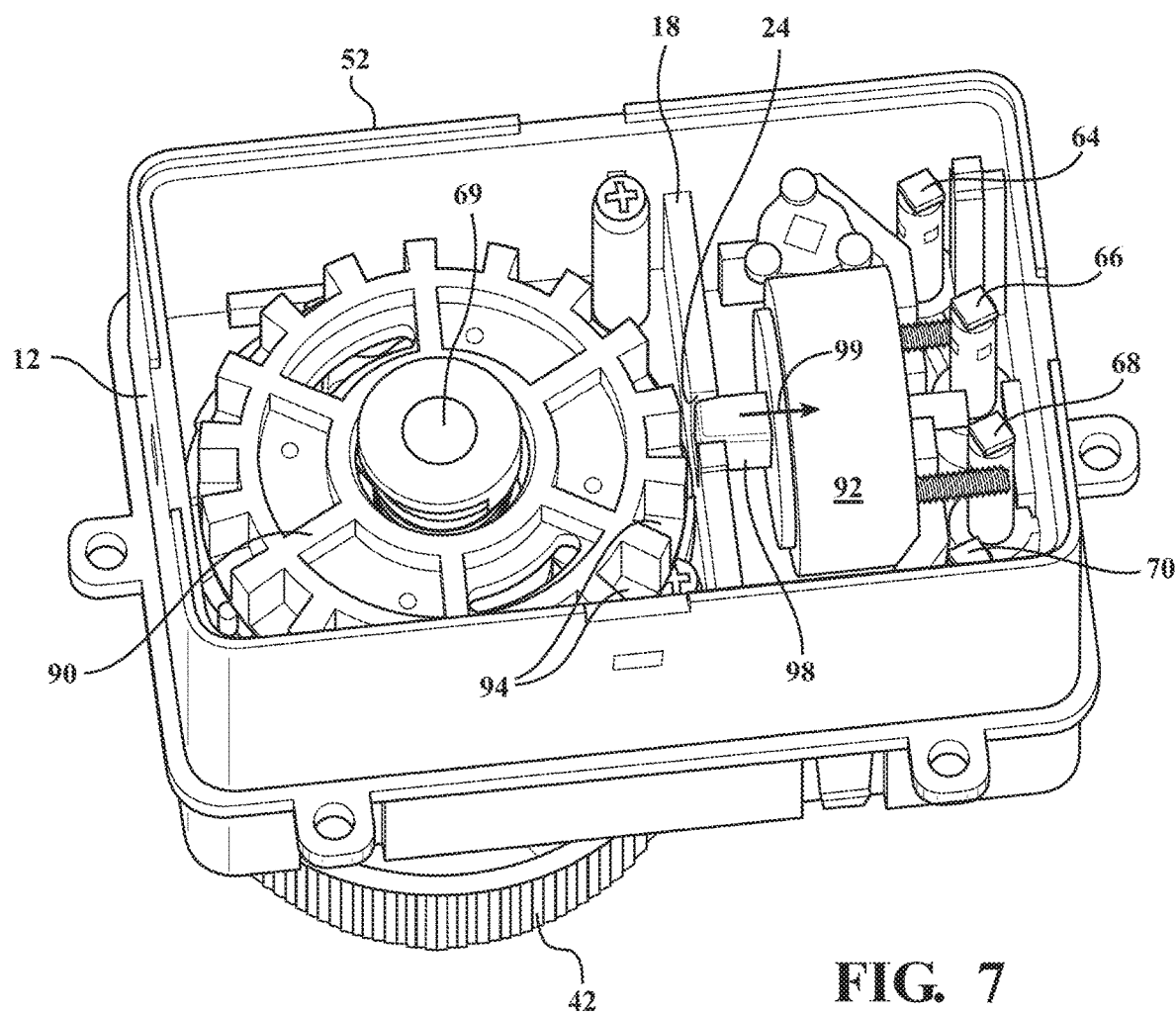
FIG. 7 is a further rotated underside perspective similar to FIG. 6 and depicting the installation of the rotary disk shaped end stopper within the primary package housing cavity and in overlaying and aligning fashion with the detent profile defining rim, the solenoid installation in the secondary package housing cavity including the linear engaging portion which is selectively extended in engagement with the end stopper or (upon being powered on) retracted out of contact with a given rotary toothed location associated with the end stopper.
Figure 11:
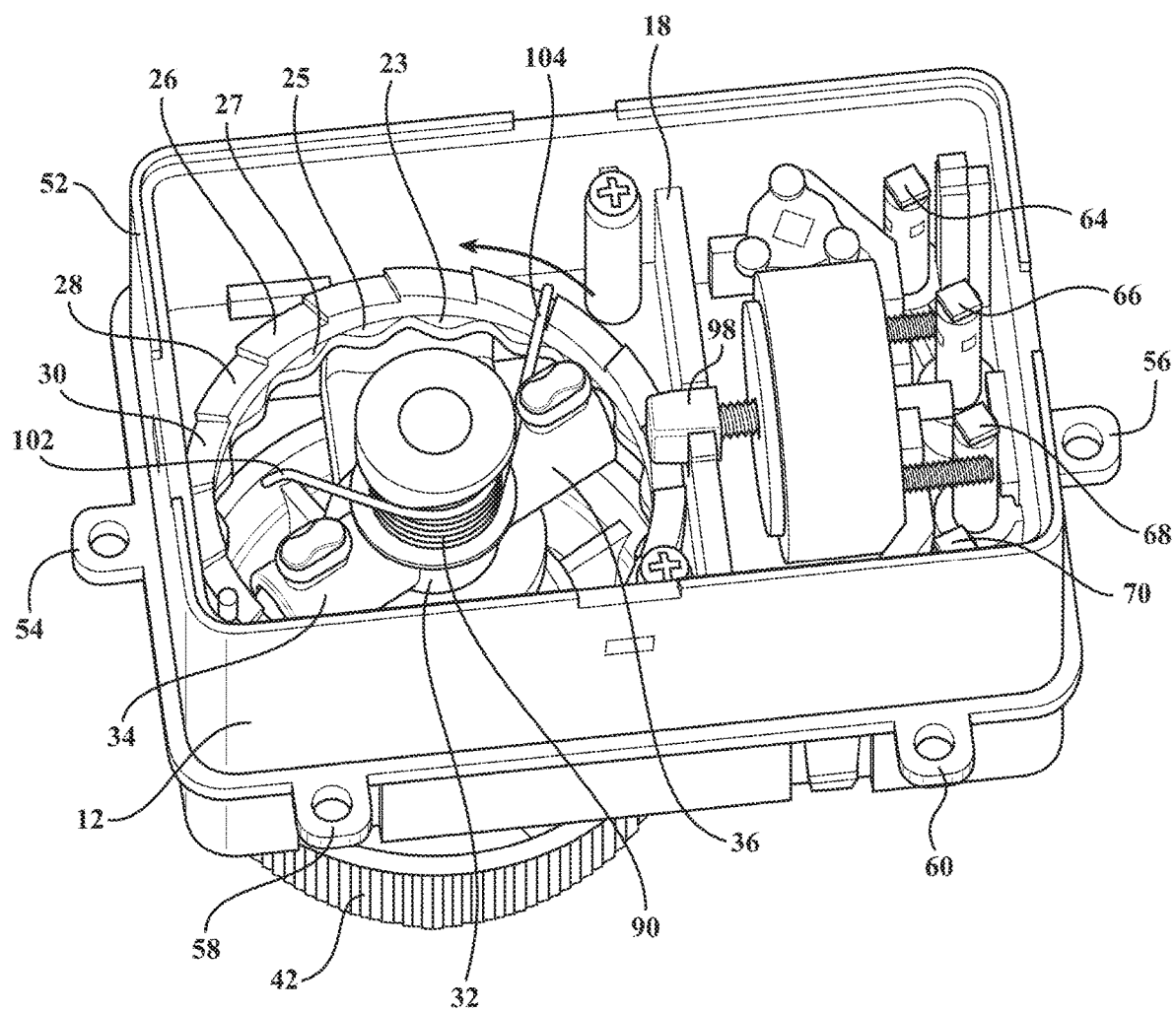
FIG. 11 is a further underside rotated perspective similar to FIG. 6 and illustrating the action of the torsional spring in response to knob rotation from Park to Reverse, Neutral and Drive gear positions, this including the spring ratchet leg being pushed over the ratchet teeth in synchronization with the gear positions, and which remains in the Drive position until subsequent release of the end stopper.

As further depicted in the underside perspectives of FIGS. 6, 7 and 11, the package housing 12 includes an inner width extending divider wall 18 separating a first cavity (see generally at 20) for receiving the auto return to park mechanism, as well as a second cavity (further at 22) for supporting the solenoid subassembly. A notch edge location (see three sided at 24) in the divider wall 18 receives a linearly actuating portion of the solenoid as will be further described.

The first cavity interior 20 of the inverted package housing 12 further has an inner aperture defining rim exhibiting a perimeter extending detent profile, which is configured by angled surfaces 23, 25, 27, et seq. in FIGS. 6 and 11, these defined upon an inner circumferential facing surface of the rim for providing tactile engagement of the plunger housing as will be further described. The rim is further defined by a plurality of partially sloping overlapping and circumferentially extending surfaces 26, 28, 30, et seq. (these also shown in FIG. 11). The surfaces 26, 28, 30, et seq. are defined along an underside interior of the main package housing 12 adjoining the inner rim defined detent surfaces. As will be further described, the circumferential overlapping arrangement of the surfaces 26, 28, 30, et seq. establish a plurality of successive ratchet teeth, these controlling successive rotation of the knob and plunger housing via an interposed torsional spring.

A generally cylindrical shaped plunger housing 32 is provided associated with the rotary knob subassembly is provided and includes a pair of lower and opposite and radial projecting guiding portions 34 and 36, these being interiorly hollowed for receiving a pair of opposing steel balls 38 and 40 and supporting detent springs, such being coil springs which are installed within the open ends of the radial projecting and guiding portions and which bias the bearings or balls outwardly from the open ends of the portions 34/36 (it being further understood that the diameter of the open ends of portions 34/36 being sized to permit a minor portion of the bearings 38/40 to project outwardly from the open ends, with the largest diameters being retained in an inner annular edge contact with interior of the portions).

A rotary knob 42 includes an underside collar 44 (see FIG. 3) affixing within an open upper rim interior of the plunger housing 12. Upon the bezel cover 14 being mounted atop the main packaging housing 12, and the plunger housing 32 being mounted through the bezel cover opening 16 and a further opening 46 (FIG. 3) associated with a collar shaped interior support of the main package housing 12 (with the knob 42 underside ledge surrounding the collar 44 supported upon the annular rim of the bezel cover 14 surrounding the opening 16), the radial projecting portions 34/36 aligning with the inwardly facing detent profile surfaces 23, 25, 27, et seq. to facilitate tactile engagement of the knob 42 and plunger housing 32.

The tactile engagement is further facilitated by the outwardly spring influenced steel balls 38/40 supported within the open interior of the radial portions 34/36 which interact in tactile induced fashion with the detent profile edges 23, 25 27, et seq., defined within the inner rim surface of the package housing to establish guided rotation of the knob 42 relative thereto. In this manner, the configuration of the detent profile further provides a clear tactile/haptic feel of a given shift position and, as will be described, further ensures that the knob will be returned to center at all gear positions.

As further shown in FIG. 3, a printed circuit board (PCB) 48 is located at the generally bottom of the package interior, secured by screws 49 with a bottom cover 50 supported underneath the PCB 48, this in turn mating with an underside outer rectangular rim edge 52 of the main housing 12. As further shown in FIG. 3, the PCB 48 and bottom cover 50 have aligning pairs of apertures (see apertures 51 of the bottom cover 50 with the screws 49 depicted seated through the apertures in the PCB 48), this in turn mating with an underside outer rectangular rim edge 52 of the main housing 12.

As further best shown in FIG. 11, the outer package housing 12 can include peripheral mounting tabs or portions (at 54, 56, 58, 60 et seq.) for mounting the overall assembly within a vehicle environment. Also shown are tabs 43 projecting from the bottom cover 50 which seat within receiving apertures 45 provided along aligning bottom edges of the main housing 12 in order to assembly the package housing together as best depicted in FIGS. 2-3.

An underside of the plunger housing 32 integrates a magnet holder 62 (see FIGS. 3 and 9) which, upon rotating the housing 32 relative to the main package housing 12 and as guided by the internal detent profile (surfaces 23, 25, 27, et seq.) adjusts a magnetic field sensed by a position sensor within the PCB board 48 (such as which is understood further to be any suitable type of inductive or magnetic Hall effect sensor) in order to detect a rotated knob position. The magnet holder 62 is depicted in separated fashion in FIGS. 3 and 9 from its inserting position through the underside of the end stopper (further depicted at 90) and in order to illustrate such features as a coil spring 63 supported on an end-most portion of its stem (also at 62).

Figure 9:
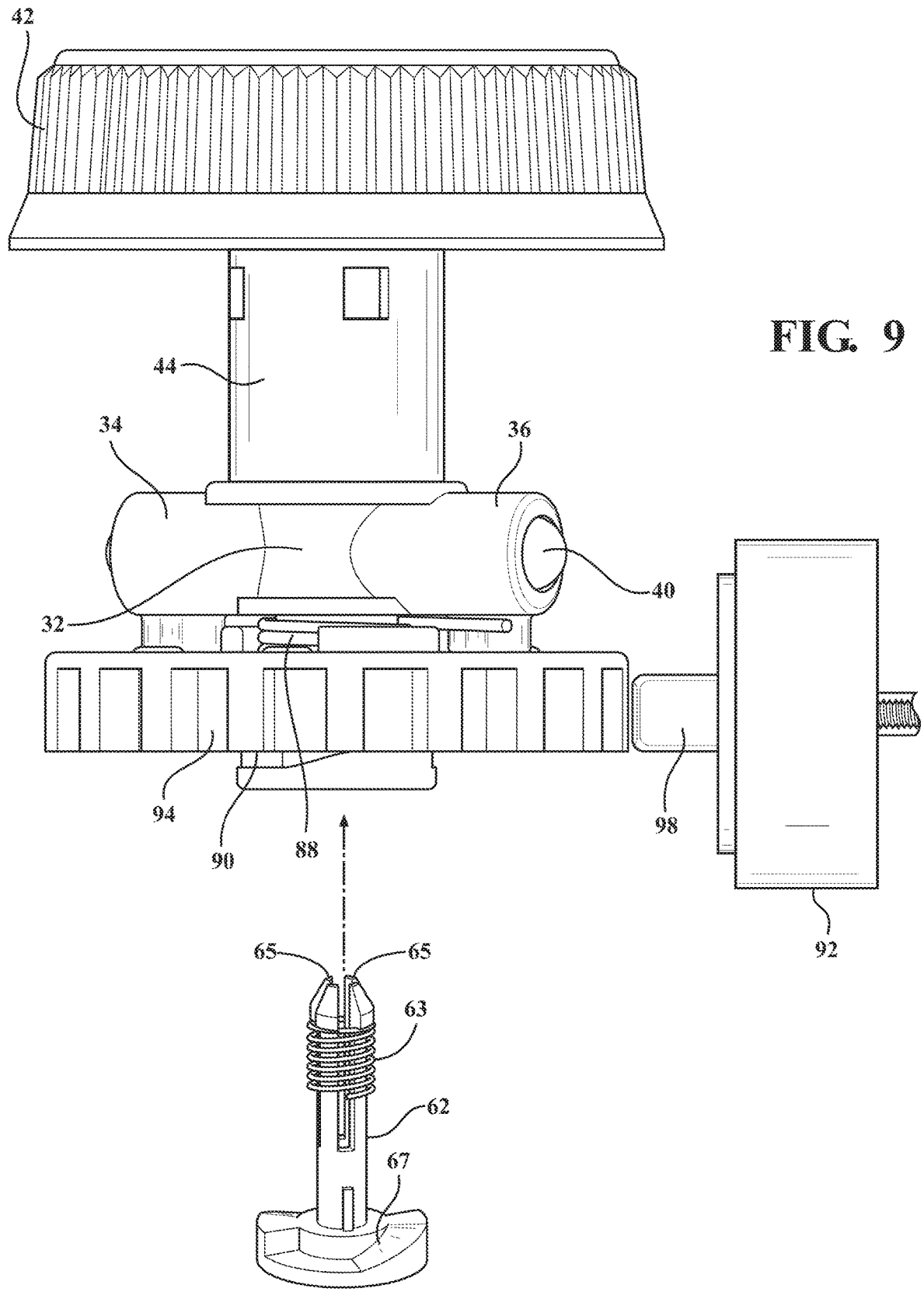
FIG. 9 is a related plan view of FIG. 8 and further illustrating the relative rotation between the knob and end stopper causing an associated magnet holder supported under the plunger housing being caused to displace downwardly into proximity to an underneath package interior supported PCB board.

As best shown in FIG. 9, the magnet holder 62 exhibits proximate deflectable beam ends 65, with an enlarged end further depicting ramped surfaces 67. A magnet 69 (see FIGS. 6 and 7) is secured to an underside of the magnet holder 62 and, due to rotation of the magnet holder (caused by rotation of the knob and plunger housing 32), the underside seating profile established between the ramped underside 67 of the magnet holder and an opposing surface of the end stopper disk 90 causes the magnet 69 to travel a nominal vertical distance (this opposed by the counter bias force of the coil spring 63 mounted to the stem of the holder 62). In this fashion, the travel of the magnet 69 is sensed by the appropriate sensor component mounted to the PCB board 48.

A plurality of light pipes are provided and include each Park, Reverse, Neutral and Drive gear position light pipes 64, 66, 68 and 70. As best shown in FIG. 3, a Sport gear position light pipe is further shown at 72 in combination with a surface "S" button fitting 74 integrated into the bezel cover 14 and a further "S" button push pad 76 located at a bottom end of the "S" gear position light pipe 72.

Each of the light pipes 64, 66, 68, 70 and 72 are supported within the package housing so that bottom open ends are in communication with individual pairs of LED's (not shown) integrated into the PCB board 48. Pairing of LED's provides one each for backlighting and gear indication respectively. Reference is also made to the illuminating RNDS locations (see at 78, 80, 82 and 84) formed into the top bezel cover 14 in FIG. 2 and in addition to the "S" position button 74.

Figure 4:
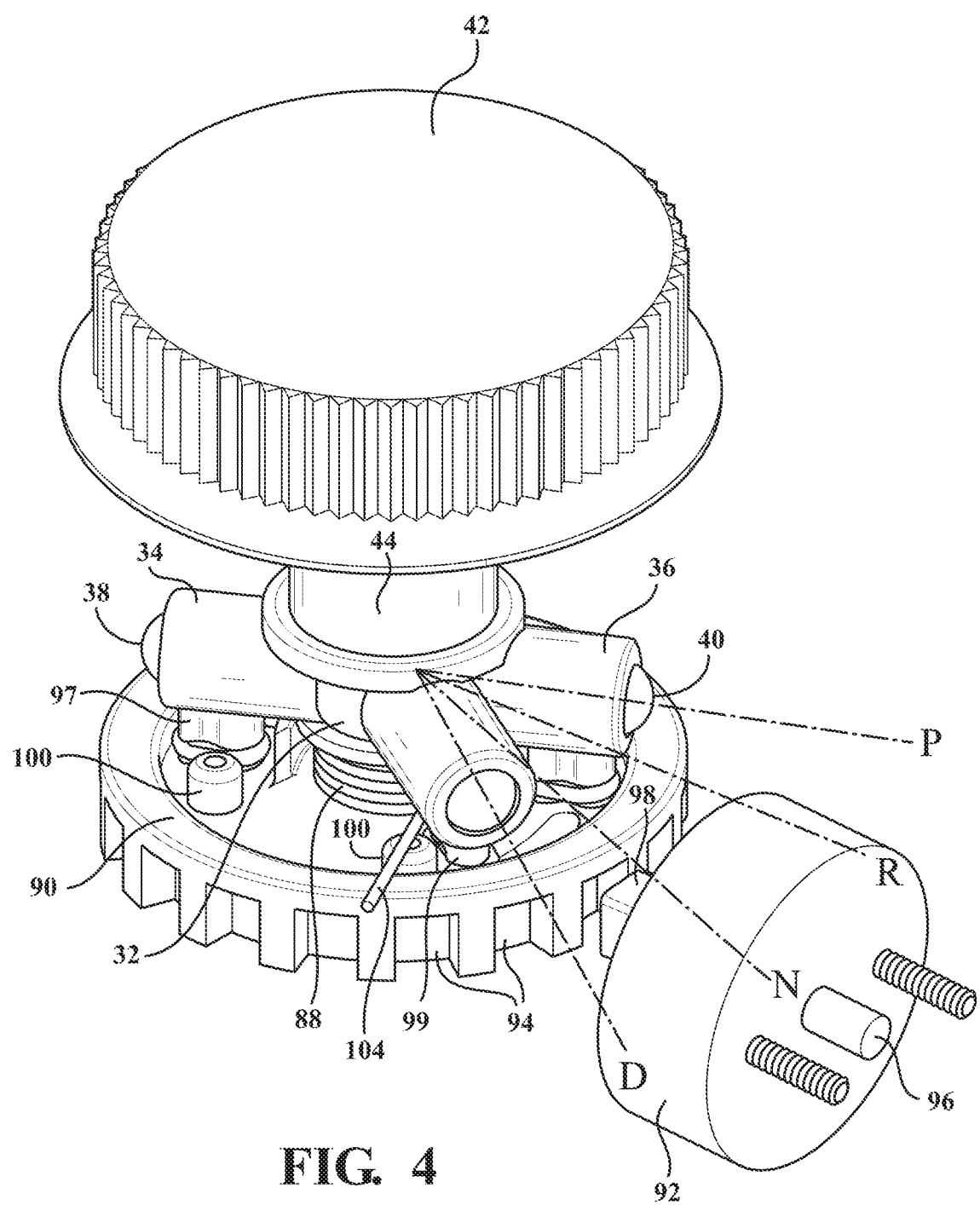
FIG. 4 is a perspective illustration of the auto-return-to-park mechanism incorporating each of the rotary knob, plunger housing, return spring, end stopper and solenoid.

Referring to FIG. 4 is a perspective illustration is shown of the auto-return-to-park mechanism incorporating each of the rotary knob 42, plunger housing 32, along with a torsional return spring 88, and end stopper disk 90 and a solenoid 92. The torsional spring 88 is supported about a stem of the magnet holder 62, the holder extending through a central aperture defined in the end stopper disk 90 so that the spring 88 is sandwiched between the end stopper disk and an underside of the plunger housing 32 (see again FIG. 3).

The end stopper disk 90 is in the form of a plasticized disk with a plurality of outwardly annular configured teeth 94 (see as best shown in FIG. 4). The solenoid 92 is energized by a current input (such as delivered at input 96) for activating retraction of a linearly extending portion 98 for engaging a recessed annular toothed location of 94 of the end stopper disk 90.

Also shown in FIG. 4 are rubber dampers 100 which are integrally configured with an upper end surface of the end stopper disk 90 and which provide desired stop locations of the disk when contacted by underside abutment locations 97 and 99 associated with the plunger housing 32. As further shown, the end stopper disk 90 is depicted as locked by the extending portion 98 displaceably supported by the solenoid 92, and so that the knob 42 can only be rotated between the Park, Neutral, Reverse and Drive gear positions.

Figure 5:
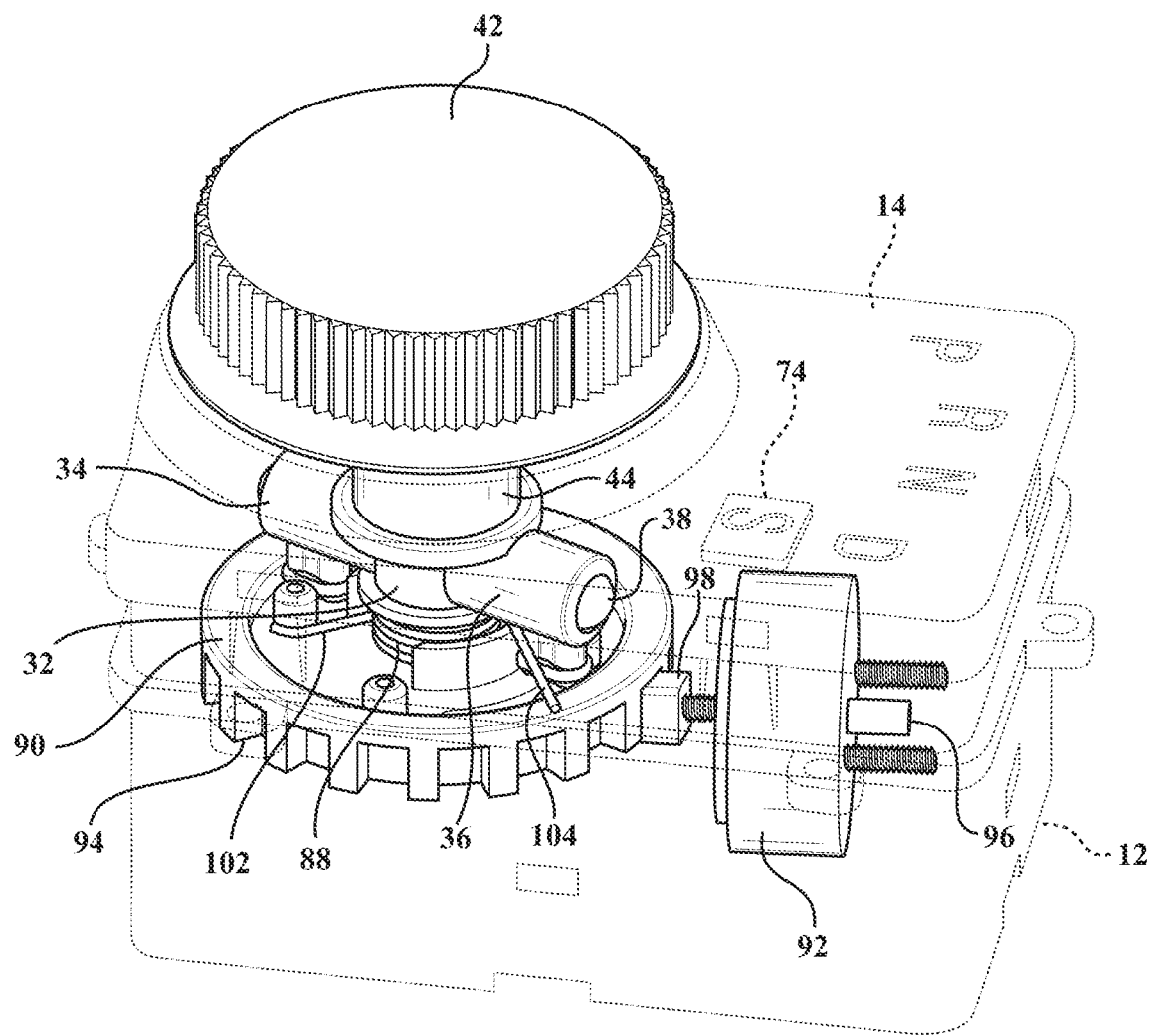
FIG. 5 is a related environmental illustration of the auto return to park mechanism depicted in FIG. 4 and shown integrated into a shifter package housing (bezel and main package housing) depicted in phantom.

FIG. 5 is a related environmental illustration of the auto return to park mechanism depicted in FIG. 4 and shown integrated into a shifter package housing (bezel and main package housing) depicted in phantom. As also shown, one extending leg 102 of the torsional spring 88 is biased against an upper location of the end stopper disk 90 (see also FIG. 6). An opposite spring leg 104 is further biased against the underside ratchet teeth 26, 28, 30.

In the position of FIG. 5, the end stopper 90 is locked by the linearly extended portion 98 of the solenoid 92. In normal shift operation, the return (torsional) spring 88 is loaded between the end stopper disk 90 (via extending leg 102) and the housing 12 (via opposite extending and biasing leg 104). In this manner, the rotary knob 42 is caused to be stopped by the end stopper locked by the solenoid 92 at the Park and Drive gear positions, with shifting effort generated by the outwardly biasing steel balls/bearings 38/40 and associated (hidden) coil spring.

This is again depicted in FIG. 6 which provides an underside assembled view depicting guided rotation between the knob integrated plunger housing 32 and the outer package supporting housing 12 assisted by a pair of opposing steel balls 38/40 and supporting detent springs which are integrated into opposite radial extending bottom portions. Ratchet style return action provided by the torsional spring 88 integrated between the end stopper 90 (not shown in FIG. 6 for purposes of clarity of illustration), and which guides the rotation of the knob 42 relative to the opposing and perimeter extending detent profile defined within an inner rim surface of the package housing (again overlapping inner rim surfaces 23, 25, 27, et seq.), the configuration of the detent profile (adjoining edge surfaces 26, 28, 30, et seq.) further providing clear tactile/haptic feel of a given shift position and further ensures that the knob will be returned to center at all gear positions;

Proceeding to FIG. 7 is a further rotated underside perspective is shown similar to FIG. 6 and depicting the installation of the rotary disk shaped end stopper disk 90 within the primary package housing cavity (again at 20 in FIG. 6) in overlaying and aligning fashion with the detent profile defining rim, the solenoid 92 installation in the secondary package housing cavity 22 including the linear engaging portion 98 which is selectively extended in engagement with the end stopper teeth location 94 or (upon being powered on) retracted out of contact with the given rotary toothed location associated with the end stopper. This is further depicted by directional arrow 99 which corresponds with the solenoid 92 retracting the engaging portion 98 from the indicated stopper teeth location 94 and through the gap 24 in the interior wall 18 separating the subset package housing cavities 20 and 22.

Figure 8:
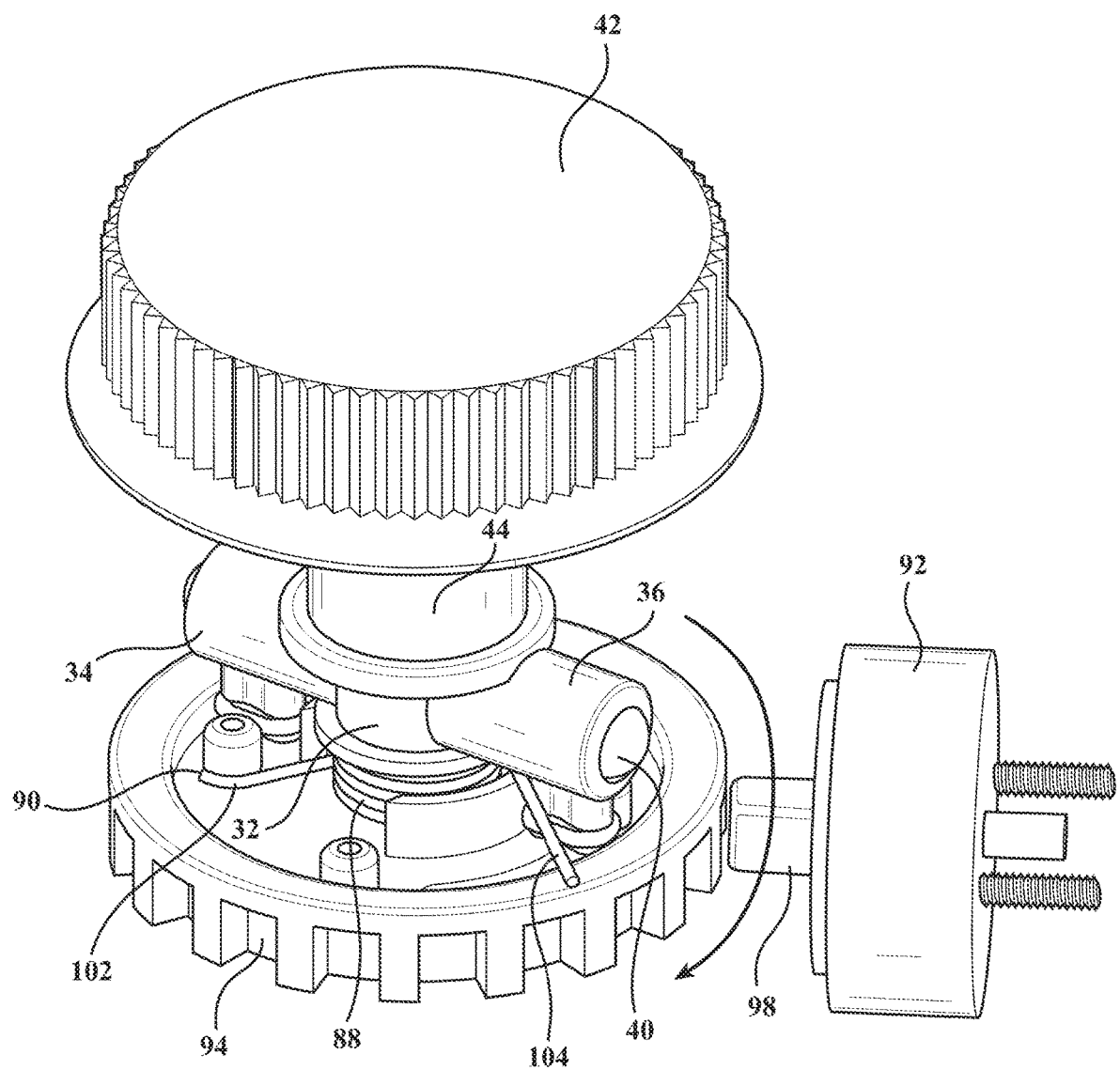
FIG. 8 is an illustration similar to FIG. 4 and depicting the action of the torsional spring, in response to solenoid retraction, for rotary influencing the end stopper to the Park position.

FIG. 8 is an illustration similar to FIG. 4 and depicting the action of the torsional spring 88, in response to retraction of the linear portion 98 of the solenoid 92, for rotary influencing the end stopper disk 90 to the Park position. FIG. 9 is a related plan view of FIG. 8 and further illustrating the relative rotation between the knob 42 and the end stopper disk 90, causing the associated magnet holder 62 supported under the plunger housing 32 being caused to displace downwardly into proximity to the underneath package interior supported PCB board 48.

In this fashion, and in the event of the driver preparing to exit the vehicle without rotating the knob 42 to the Park gear position, the solenoid 92 is caused to be powered on (to thereby retract from the outer annular toothed location 94) and the end stopper disk 90 thereby released. The torsion spring 88 at that point pushes the end stopper disk 90 to the current knob position (also termed New Park position). Concurrently, the magnet holder 62 is caused to travel downwardly in proximity to the sensor integrated into the PCB board 48 in order to confirm the movement (see again FIG. 9).

Figure 10:
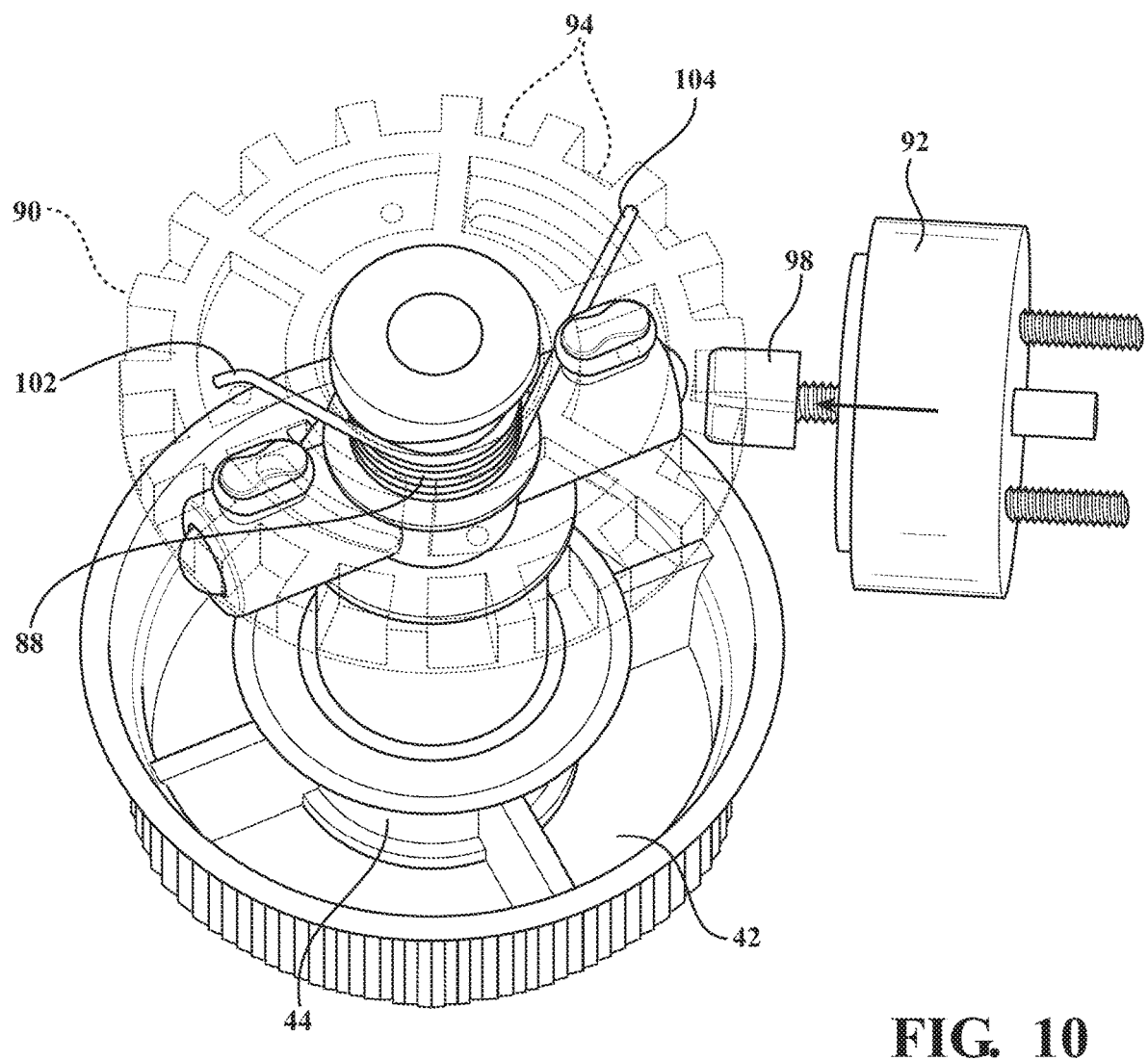
FIG. 10 is an inverted illustration of the auto return-to-park mechanism proceeding from FIG. 9, and with the end stopper shown partially transparent and in order to better illustrate the solenoid being de-energized (extended) into locking position with the rotary adjusted end stopper.

FIG. 10 is an inverted illustration of the auto return-to-park mechanism proceeding from FIG. 9, and with the end stopper disk 90 shown partially transparent in order to better illustrate the solenoid 92 being de-energized (extended) into locking position with the rotary adjusted end stopper. FIG. 11 is a further underside rotated perspective similar to FIG. 6 and, upon the knob being rotated from the Park, Neutral, Reverse and Drive positions, results in the torsional spring 88 ratchet leg 104 being pushed over the ratchet teeth (again overlapping surfaces 26, 28, 30, et. seq.) in synchronization with the gear positions (PRND), and which remains in the Drive position until subsequent release of the end stopper 90.

In this manner, and if the shifter is in any other position than Park, an incident in which the driver is preparing to exist the vehicle (unlatching the seat belt and/or opening the driver side vehicle door), the shifter will reset the current gear position to Park (this occurring without any movement of the knob). The driver can further only turn the knob clockwise to each of the Reverse, Neutral, Drive and (optionally) Sport position, however cannot turn the knob in an anti-clockwise direction in the new Park position.

The ability to utilize the auto return to park rotary shifter with the rotary end stopper disk, solenoid, and torsional spring (in contrast to the arrangement of multiple motors or solenoids associated with fixed position rotary shifters) provides a much more simplified and reliable design for ensuring a return to Park condition.

We claim:

1. A rotary shifter, comprising:
    a housing with a bezel cover;
    an auto return to park mechanism including a knob supported upon said bezel cover, a rotary disk end stopper secured to said knob and seated within the housing, a spring rotationally biasing said end stopper relative to said housing;
    said bezel cover further including an annular opening receiving said knob;
    an inner aperture defining rim incorporated into a main package defining portion of said housing, said rim further exhibiting a perimeter extending detent profile which is defined by a plurality of inter-connecting and inner rim configured surfaces;
    a solenoid supported within said housing and engaging said end stopper in a first condition limiting said knob to manual rotary shifting between Park, Reverse, Neutral and Drive gear shift positions;
    a PCB board integrated into said housing and communicable with at least one external sensor associated with a driver exit condition; and
    upon a triggering of said exit condition with said shifter in other than a Park position, said solenoid being energized to disengage said end stopper in a second release condition permitting said spring to reset said stopper and knob to the Park position.

2. The rotary shifter as described in claim 1, further comprising a cylindrical shaped plunger housing to which is secured said rotary knob, said plunger housing having a pair of lower and opposite and radial projecting guiding portions, these being interiorly hollowed for receiving a pair of opposing steel balls and supporting detent springs.

3. The rotary shifter as described in claim 2, said rotary knob further comprising an underside collar affixing within an open upper rim interior of said plunger housing which is in turn mounted through said bezel cover opening and a further opening associated with said main package defining portion so that said radial projecting portions align with said inwardly facing detent profile, said outwardly influenced steel balls supported within said open interior of said radial portions interacting in tactile induced fashion with said detent profile edges defined within said inner rim surface of said package housing to establish guided rotation of said knob.

4. The rotary shifter as described in claim 2, said driver exit condition further comprising a magnet and holder integrated into an underside of said plunger housing in proximity to said PCB board integrated into said housing, relative motion between said knob and said end stopper causing said magnet to displace downwardly toward said PCB board.

5. The rotary shifter as described in claim 4, further comprising a plurality of light pipes including each of a center Park position light pipe and a separate plurality of further shifter position light pipes, said light pipes being arranged within said housing so that bottom open ends are in communication with individual LED's integrated into said PCB board.

6. The rotary shifter as described in claim 5, said individual LED's further comprising pairs of LED's for providing each of backlighting and gear indication respectively for each shifter position.

7. The rotary shifter as described in claim 4, said spring further comprising a torsional spring supported about a stem of said magnet holder, a first extending leg of said spring abutting against said end stopper, an opposite second end of said spring biasing against a plurality of ratchet teeth configured upon an underside of said inner aperture defined rim in said housing.

8. The rotary shifter as described in claim 1, said auto return to park mechanism seating within a first cavity defined in said housing, said solenoid being supported in a second cavity, a linearly extending portion of said solenoid extending into said first cavity and engaging an outward toothed location of said end stopper.

9. The rotary shifter as described in claim 3, said plunger housing further comprising underside projections which abut damper locations of said end stopper when shifting between said gear positions.

10. A rotary shifter, comprising:
a housing;
an auto return to park mechanism including a knob supported upon said housing, a rotary disk end stopper secured to said knob and seated within said housing, a spring rotationally biasing said end stopper relative to said housing;
a bezel cover securing over said housing, an annular opening defined within said bezel cover for receiving said knob;
an inner aperture defining rim incorporated into a main package defining portion of said housing, said rim further exhibiting a perimeter extending detent profile which is defined by a plurality of inter-connecting and inner rim configured surfaces;
a solenoid supported within said housing and including a linearly extending portion engaging said end stopper in a first condition limiting said knob to manual rotary shifting between Park, Reverse, Neutral and Drive gear shift positions;
said auto return to park mechanism seating within a first cavity defined in said housing, said solenoid being supported in a second cavity such that said linearly extending portion of said solenoid extends into said first cavity and engages an outward toothed location of said end stopper;
a PCB board integrated into said housing and communicable with at least one external sensor associated with a driver exit condition; and
upon a triggering of said exit condition with said shifter in other than a Park position, said solenoid being energized to disengage said end stopper in a second release condition permitting said spring to reset said stopper and knob to the Park position.

11. The rotary shifter as described in claim 10, further comprising a cylindrical shaped plunger housing to which is secured said rotary knob, said plunger housing having a pair of lower and opposite and radial projecting guiding portions, these being interiorly hollowed for receiving a pair of opposing steel balls and supporting detent springs.

12. The rotary shifter as described in claim 11, said rotary knob further comprising an underside collar affixing within an open upper rim interior of said plunger housing which is in turn mounted through said bezel cover opening and a further opening associated with said main package housing so that said radial projecting portions align with said inwardly facing detent profile, said outwardly influenced steel balls supported within said open interior of said radial portions interacting in tactile induced fashion with said detent profile edges defined within said inner rim surface of said package housing to establish guided rotation of said knob.

13. The rotary shifter as described in claim 11, said driver exit condition further comprising a magnet and holder integrated into an underside of said plunger housing in proximity to said PCB board integrated into said housing, relative motion between said knob and said end stopper causing said magnet to displace downwardly toward said PCB board.

14. The rotary shifter as described in claim 13, further comprising a plurality of light pipes including each of a center Park position light pipe and a separate plurality of further shifter position light pipes, said light pipes being arranged within said housing so that bottom open ends are in communication with individual LED's integrated into said PCB board.

15. The rotary shifter as described in claim 14, said individual LED's further comprising pairs of LED's for providing each of backlighting and gear indication respectively for each shifter position.

16. A rotary shifter, comprising:
a housing with a bezel cover;
an auto return to park mechanism including a rotary knob supported upon said bezel cover, a rotary disk shaped end stopper secured to said knob and seated within the housing, a spring rotationally biasing said end stopper relative to said housing;
a solenoid supported within said housing and engaging said end stopper in a first condition, limiting said knob to manual rotary shifting between Park, Reverse, Neutral and Drive gear shift positions;
a cylindrical shaped plunger housing secured to said rotary knob and including at least one radial projecting guiding portion contacting an inner rim of said housing defined by a plurality of detent locations;
a PCB board integrated into said housing and communicable with at least one external sensor associated with a driver exit condition;
a plurality of light pipes including each of a center Park position light pipe and a separate plurality of further shifter position light pipes, said light pipes being arranged within said housing so that bottom open ends are in communication with individual LED's integrated into said PCB board;
a magnet and holder integrated into an underside of said plunger assembly in proximity to said PCB board such that relative motion between said knob and said end stopper causes said magnet to displace downwardly toward said PCB board; and upon a triggering of said exit condition with said shifter in other than a Park position, said solenoid being energized to disengage said end stopper in a second release condition permitting said spring to cause said radial projecting guiding portions to rotatably displace along said detent locations to reset said stopper and knob to the Park position.

\* \* \* \* \*